(12) United States Patent
Fritzon (10) Patent No.: US 9,010,478 B2
(45) Date of Patent: Apr. 21, 2015

(54) SAFETY ARRANGEMENT FOR A VEHICLE

(71) Applicant: Volvo Car Corporation, Gothenburg (SE)

(72) Inventor: Jan-Erik Fritzon, Torslanda (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 14/079,116

(22) Filed: Nov. 13, 2013

(65) Prior Publication Data

US 2014/0132036 A1    May 15, 2014

(30) Foreign Application Priority Data

Nov. 15, 2012 (EP) .................................. 12192762

(51) Int. Cl.
*B60R 21/38* (2011.01)
*B62D 25/10* (2006.01)

(52) U.S. Cl.
CPC .............. *B62D 25/105* (2013.01); *B60R 21/38* (2013.01); *Y10S 292/14* (2013.01)

(58) Field of Classification Search
CPC ...... B60R 21/38; B60R 21/34; B62D 25/105; E05B 77/08
USPC ............. 180/274, 69.21; 296/187.04, 193.11; 292/DIG. 14
See application file for complete search history.

(56) References Cited

U.S. PATENT DOCUMENTS

| 6,439,330 | B1 * | 8/2002 | Paye | ........................... | 180/69.21 |
| 7,232,178 | B2 * | 6/2007 | Neal et al. | ................. | 296/187.04 |
| 7,661,496 | B2 * | 2/2010 | Schafer | ........................ | 180/69.2 |
| 2006/0175844 | A1 | 8/2006 | Neal et al. | | |
| 2008/0042461 | A1 * | 2/2008 | Schafer | ........................ | 296/1.04 |
| 2010/0270813 | A1 * | 10/2010 | Roth et al. | ..................... | 292/121 |

FOREIGN PATENT DOCUMENTS

| DE | 10152621 A1 | 5/2003 |
| DE | 10319366 A1 | 9/2004 |
| DE | 10314968 A1 | 10/2004 |
| DE | 102007017130 A1 | 10/2008 |
| JP | 58221773 A | 12/1983 |
| JP | 59006174 A | 1/1984 |
| JP | 59026370 A | 2/1984 |
| JP | 2009083604 A | 4/2009 |
| JP | 2010235040 A | 10/2010 |

OTHER PUBLICATIONS

Extended European Search Report Dated Mar. 14, 2013, Application No. 12192762.8-1503, Applicant Volvo Car Corporation, 7 Pages.

\* cited by examiner

*Primary Examiner* — Ruth Ilan
(74) *Attorney, Agent, or Firm* — Brooks Kushman P.C.

(57) ABSTRACT

The present disclosure relates to a safety arrangement for a vehicle. The safety arrangement comprises a bonnet being displaceable between a closed position, an open position, permitting access to an engine compartment of the vehicle, and a deployed position, in which position there is a gap between the bonnet and the engine compartment. The bonnet is displaceable from the closed position to the deployed position, which is located upwards and rearwards as compared to the closed position. Further, the bonnet is directly openable to the open position both from the closed position and from the deployed position.

17 Claims, 7 Drawing Sheets

SAFETY ARRANGEMENT FOR A VEHICLE

CROSS-REFERENCE TO RELATED APPLICATIONS

This application claims foreign priority benefits under 35 U.S.C. §119(a)-(d) to European patent application number EP 12192762.8, filed Nov. 15, 2012, which is incorporated by reference in its entirety.

TECHNICAL FIELD

The present disclosure relates to a safety arrangement for a vehicle comprising a bonnet having a closed position, an open position and a deployed position.

BACKGROUND

If a motor vehicle, such as a car, is involved in an accident in which the front part of the vehicle hits a vulnerable road user, such as a pedestrian or a cyclist, it is not uncommon that the head of the vulnerable road user impacts on the bonnet of the vehicle. The vulnerable road user may in that case be severely injured. One parameter, which can affect the severity of the injury, is the fact that the bonnet, which is usually formed from thin metal sheet, would tend to bend, and then deform on hard engine parts, such as an engine block, located in an engine compartment beneath the bonnet. In order to reduce the severity of these accidents, it is well-known to use a deployable bonnet. By raising the rear part of the deployable bonnet to a deployed position, the distance between the bonnet and the hard engine parts is increased, and thereby the consequences of such an impact are mitigated.

The bonnet is in American English known as a hood, but herein the British English term bonnet is used.

Document DE 101 52 621 A1 discloses a safety arrangement including a bonnet with at least one rear hinge device attached to the bonnet and a body of the vehicle. In a collision with a vulnerable road user, the bonnet is raised at the rear end. The front region of the bonnet is thereby forcibly raised by means of a mechanical coupling. Therefore, in the deployed position, the bonnet is raised both at the front and rear ends.

Further, according to DE 101 52 621 A1, the front end of the bonnet is moved to the deployed position before it is possible to open the bonnet in a normal way, i.e., pivoting around the rear end, in order to permit access to the engine compartment for service, maintenance and repair. Therefore, according to DE 101 52 621 A1, there is no need for a locking mechanism retaining the bonnet in the closed position.

Thus, in the safety arrangement according to DE 101 52 621 A1 the bonnet is displaced from the closed position to the open position via the deployed position. Likewise, the bonnet is displaced back from the open position via the deployed position to the closed position. It is thus not possible to displace the bonnet directly from the closed to the open position, making the normal opening of the bonnet a bit complicated.

SUMMARY

The object of the present disclosure is to overcome or ameliorate at least one of the disadvantages of the prior art, or to provide a useful alternative.

It is desirable to provide a bonnet being raised both at the front end and the rear end, when in the deployed position.

It is further desirable to provide a bonnet, which is directly openable both from the closed position and from the deployed position.

Thus, in a first aspect of the present disclosure there is provided a safety arrangement for a vehicle. The safety arrangement comprises a bonnet being displaceable between
   a closed position,
   an open position, permitting access to an engine compartment of the vehicle, and
   a deployed position, in which position there is a gap between the bonnet and the engine compartment.

The bonnet is displaceable from the closed position to the deployed position, which is located upwards and rearwards as compared to the closed position. Further, the bonnet is directly openable to the open position both from the closed position and from the deployed position.

The closed position is the normal position of the bonnet, which for example is used when driving the vehicle or parking the vehicle. The bonnet then covers the engine compartment.

The open position permits access to the engine compartment of the vehicle e.g., for service, maintenance or repair work. In order to reach the open position, the bonnet may be pivoted around a pivot axis extending substantially in the lateral direction of the vehicle at or adjacent to a rear end of the bonnet.

The safety arrangement according to the disclosure is also useful for a bonnet being pivoted around a pivot axis at or adjacent to a front end of the bonnet.

The deployed position is located upwards and rearwards as compared to the closed position. Upwards and rearwards are defined in relation to a body of the vehicle, when standing on a horizontal plane. By raising the rear end of the bonnet to the deployed position, the distance between the bonnet and the hard engine parts is increased, thereby reducing the severity of an accident involving a vulnerable road user impacting on the bonnet. However, in addition the safety arrangement of the invention also raises the front end of the bonnet, and hence the whole bonnet is raised in the deployed position. This is advantageous, in case the vulnerable road user hits the front portion of the bonnet, e.g., if the vulnerable road user is short, such as a child.

The bonnet being directly openable means that the bonnet does not have to go to any other position, which is passed during the displacement between the closed and the deployed positions, in order to be opened. For example, if in the deployed position, there is no need to first move the bonnet back to the closed position in order to open it, instead the bonnet may move directly from the deployed position to the open position. In a similar way, if in the closed position, there is no need to move the bonnet to the deployed position in order to open it, instead the bonnet may move directly from the closed position to the open position without passing the deployed position. As described above, the bonnet may be pivoted at or adjacent to its rear end in order to open it. In that case, the rotational movement of the front end can start from either the closed or the deployed position.

Preferably, the bonnet is in addition directly openable from a position being passed during the displacement from the closed position to the deployed position. The bonnet may be arranged such that it is directly openable from substantially any position being passed during the displacement, or even from any position being passed during the displacement between the closed and the deployed positions. As described above, the bonnet may be pivoted at or adjacent to its rear end in order to open it. In that case, the rotational movement of the front end can start from any position being passed during the displacement between the closed position and the deployed position.

The bonnet is preferably arranged such that when displacing it from the closed position to the deployed position, the bonnet moves simultaneously upwards and rearwards. Hence, also the front end moves simultaneously upwards and rearwards.

In an embodiment of the disclosure, the bonnet is arranged to initially move straight upwards when being opened. If the displacement used to reach the open position is a pure rotation e.g. pivoting around the rear end, the front end moves along a circle, the tangent of which will initially be directed straight upwards. However, for some bonnets the displacement towards the open position will instead initially comprise a translational movement in the vertical direction, i.e., upwards, such that the front end thereafter may rotate freely without interfering with the body of the vehicle. The translational displacement may then be followed by a rotational displacement. Further, the motion of the front end from the closed position to the open position may be a combination of translational and rotational displacement.

The safety arrangement may be arranged such that the deployed position of the bonnet permits a partial access to the engine compartment, e.g., for filling a vehicular liquid, such as a washer fluid or a coolant. Thereby there is no need to open the bonnet to the open position for such tasks.

The safety arrangement may be arranged such that a front end of the bonnet is displaced rearwards by at least 40 mm, preferably at least 60 mm, and most preferably at least 100 mm, in relation to the body of the vehicle during the displacement from the closed position to the deployed position. Thereby, it is possible to provide a large enough gap in the deployed position between the bonnet and any hard engine parts. Further, in the case of partial access to the engine compartment, there will be enough room to fill the vehicular liquid.

The bonnet may also be displaceable from the deployed position to the closed position. Thereby the bonnet may be reset after a collision involving a vulnerable road user. Further, in the case of partial access to the engine compartment, it is preferred that the bonnet may be raised to the deployed position and moved back to the closed position as many times as desired.

Due to the weight of the bonnet, there is a risk of a downswing when closing the bonnet, i.e., the bonnet continues downwards after having passed the closed position. It is thus common practice to provide an extra safety gap of e.g., 5-10 mm between the bonnet and the body of the vehicle, in order to avoid that the down-swinging bonnet impacts with the body of the vehicle, possibly damaging the bonnet itself or another part of the vehicle, such as a headlight, a fender or a bumper.

The safety arrangement according to the invention may be adapted to be closed to a safe-close position, which is a position being passed during the displacement from the closed position to the deployed position, which is however not closer to the closed position than a nearest safe-close position. The nearest safe-close position is selected, such that a vertical distance between the bonnet and the body of the vehicle resulting from the upwards and rearwards displacement of the bonnet is large enough to cope with a possible down-swing of the bonnet, when closing it. The vertical distance in the nearest safe-close position may for example be in the range of 5-10 mm. Thereby the above extra safety gap may be omitted. It is then safe to close the bonnet to any position between, and including, the nearest safe-close position and the deployed position. The bonnet is thereafter moved from the safe-close position to the closed position.

The safety arrangement may comprise a catch and a lock member. One of the catch or the lock member is adapted to be fastened at the front end of the bonnet, and the other of the catch or the lock member is adapted to be fastened to the body of the vehicle at a position permitting cooperation between the catch and the lock member. The catch or lock member adapted to be fastened at the front end of the bonnet is displaced upwards and rearwards in relation to the other of the catch or lock member during the displacement of the bonnet from the closed position to the deployed position. For example, if the catch is attached to the bonnet and the lock member to the body of the vehicle, the catch is displaced upwards and rearwards in relation to the lock member, when the bonnet is deployed. Vice versa, if the lock member is attached to the bonnet and the catch to the body of the vehicle, the lock member is displaced upwards and rearwards in relation to the catch, when the bonnet is deployed.

One pair of catch and lock member may be used. In that case, one of them is preferably located at or adjacent to the center of the front end of the bonnet, and the other at the corresponding location of the body of the vehicle. Alternatively, two, three or more pairs of catch and lock member may be used. The catch may be fastened at the front end of the bonnet and the lock member may be fastened to the body of the vehicle, or vice versa.

Preferably, the catch and the lock member may be moved back again relative to each other, when the bonnet is displaced back from the deployed position to the closed position. Thereby the positions of the catch and the lock member relative to each other may be reset after a collision involving a vulnerable road user. Further, in the case of partial access to the engine compartment, as described above, it is preferred that the catch and the lock member are displaceable back and forth relative to each other as many times as desired.

The safety arrangement may be arranged such that the lock member has a locked state and an unlocked state. The unlocked state permits the bonnet to be opened to the open position permitting access to the engine compartment of the vehicle. Purely as an example, the lock member may comprise a pin, which in the locked state is protruding, such that it goes through the catch, thereby retaining the catch, resulting in that the bonnet is locked and cannot be opened. In the unlocked state, the pin is retracted and thereby moved out of the catch, resulting in that the bonnet is unlocked and may be displaced to the open position. Alternatively, the lock member may comprise a lock member portion, which is rotated out of the way, to thereby permit the catch to be removed from the lock member. The lock member normally is in its locked state. The lock member is then set to the unlocked state, when the bonnet is to be opened. Therefore, the lock member normally is in its locked state, when the bonnet is in its closed position, as well as when it is in its deployed position, and also during the displacement between these two positions.

In an embodiment, the catch comprises an aperture with a closed circumference, at least a portion of the lock member being displaced within the closed circumference during displacement of the bonnet from the closed position to the deployed position. Preferably, the displacement of the bonnet from the closed position to the deployed position is guided by the lock member following at least a portion of the closed circumference. The portion of the closed circumference is thus arranged such that it results in the desired motion upwards and rearwards. The closed circumference may for that purpose comprise an inclined portion having an angle of between 20 and 80 degrees, preferably between 30 and 70 degrees, and most preferably between 40 and 60 degrees to a horizontal plane of the vehicle. If using the above-mentioned nearest safe-close position, the position of the nearest safe-close position will depend on the geometry of the closed circumference of the aperture.

The safety arrangement may further comprise a hinge adapted to be located at or adjacent to a rear end of a bonnet of a vehicle. The hinge is displaceable between a normal position, corresponding to the bonnet being in the closed position, and a deployed position, corresponding to the bonnet being in the deployed position. The hinge comprises a first pivotal axis and a second pivotal axis being separated by an arm. The first pivotal axis pivotally connects the arm to the body of the vehicle. The second pivotal axis pivotally connects the arm to the bonnet. In the normal position of the hinge, the arm forms an acute angle in relation to the body of the vehicle and an obtuse angle in relation to the bonnet. Thereby, the second pivotal axis is located in front of the first pivotal axis, and also vertically above the first pivotal axis. In the deployed position, the arm is substantially vertical.

In the deployed position of the hinge, the arm may form a substantially right angle in relation to the body of the vehicle and/or a substantially right angle in relation to the bonnet. Thereby, the second pivotal axis is located substantially straight above the first pivotal axis. Hence, the hinge may be raised as far upwards as possible.

Preferably the hinge is also displaceable from the deployed position back to the normal position, corresponding to the bonnet being displaceable from the deployed position to the closed position. Thereby the pivotal axes of the hinge may be moved back to their normal positions relative to each other after a collision involving a vulnerable road user. Further, in the case of partial access to the engine compartment, it is preferred that the hinge is displaceable back to its normal position as many times as desired.

In an embodiment, the hinge comprises:
 a first portion being adapted to be attached to the body of the vehicle,
 a second portion being adapted to be attached to the bonnet, and
 a third elongate portion comprising a first and a second end.

The third portion is pivotally connected to the first portion by the first pivotal axis at or adjacent to the first end. The third portion is also pivotally connected by the second pivotal axis to the second portion at or adjacent to the second end. The third portion then forms the arm of the hinge. In the normal position of the hinge, the third portion forms an acute angle in relation to the first portion and an obtuse angle in relation to the second portion. The first, second and third portions then together form a V-like shape. In the deployed position, the first, second and third portions together form a U-like shape, wherein the third portion is substantially vertical.

In the deployed position of the hinge, the third portion may form a substantially right angle in relation to the first portion and/or a substantially a right angle in relation to the second portion. Thereby, the hinge may be raised as far upwards as possible.

Preferably, the second portion of the hinge is arranged to be displaced upwards and rearwards in relation to the first portion of the hinge during the displacement of the bonnet from the closed position to the deployed position.

The hinge may further comprise a spring member attached between the body of the vehicle and the arm, the spring member preferably being arranged such that it is tensioned in the normal position of the hinge and released in the deployed position of the hinge. The tension in the normal position may be due to compression, e.g., in case the spring member comprises a helical spring. The spring member is arranged to be able to displace the hinge to the deployed position.

Further, the hinge may comprise a means, e.g., a pyrotechnic means, adapted to deploy the bonnet in a quick way to the deployed position, in case of an accident with a vulnerable road user being detected. Such a means normally has to be replaced after having been used once in order to make the safety arrangement prepared for another accident involving a vulnerable road user.

Alternatively, or in addition, the above-mentioned spring member may be used to displace the bonnet to the deployed position, in case of an accident with a vulnerable road user being detected.

If the bonnet is displaced to the deployed position in order to permit a partial access to the engine compartment, as described above, the speed of deployment is not a critical issue. The bonnet may in that case be opened by the spring member being released by the user of the vehicle, e.g., by means of a handle located within the compartment of the vehicle being mechanically or electronically coupled to a release mechanism for the spring member. When the bonnet, and thus also the hinge, is displaced back to its normal position, the spring member is tensioned again, e.g., compressed in the case of the helical spring. In this case, the means, e.g., the pyrotechnic means, adapted to deploy the bonnet in a quick way was never used, so the safety arrangement is still prepared for an accident involving a vulnerable road user. The handle located within the compartment of the vehicle may be arranged such that it is possible to displace the bonnet from the deployed position back to the closed position by means of the handle. Alternatively, the bonnet may be displaced back to the closed position by the user by hand.

In a second aspect of the present disclosure there is provided a vehicle comprising a safety arrangement according to any one of the preceding claims. The safety arrangement may comprise a catch and lock member and/or a hinge according to above.

BRIEF DESCRIPTION OF THE DRAWINGS

Non-limiting examples according to the present disclosure will hereinafter be further explained with reference to the attached drawings.

It should be noted that the appended drawings are not necessarily drawn to scale and that the dimensions of some features of the present disclosure may have been exaggerated for the sake of clarity.

DETAILED DESCRIPTION

The disclosure will, in the following, be exemplified by embodiments. It should however be realized that the embodiments are included in order to explain principles of the disclosure and not to limit the scope of the disclosure, defined by the appended claims. Details from two or more of the embodiments may be combined with each other.

Figure 1:
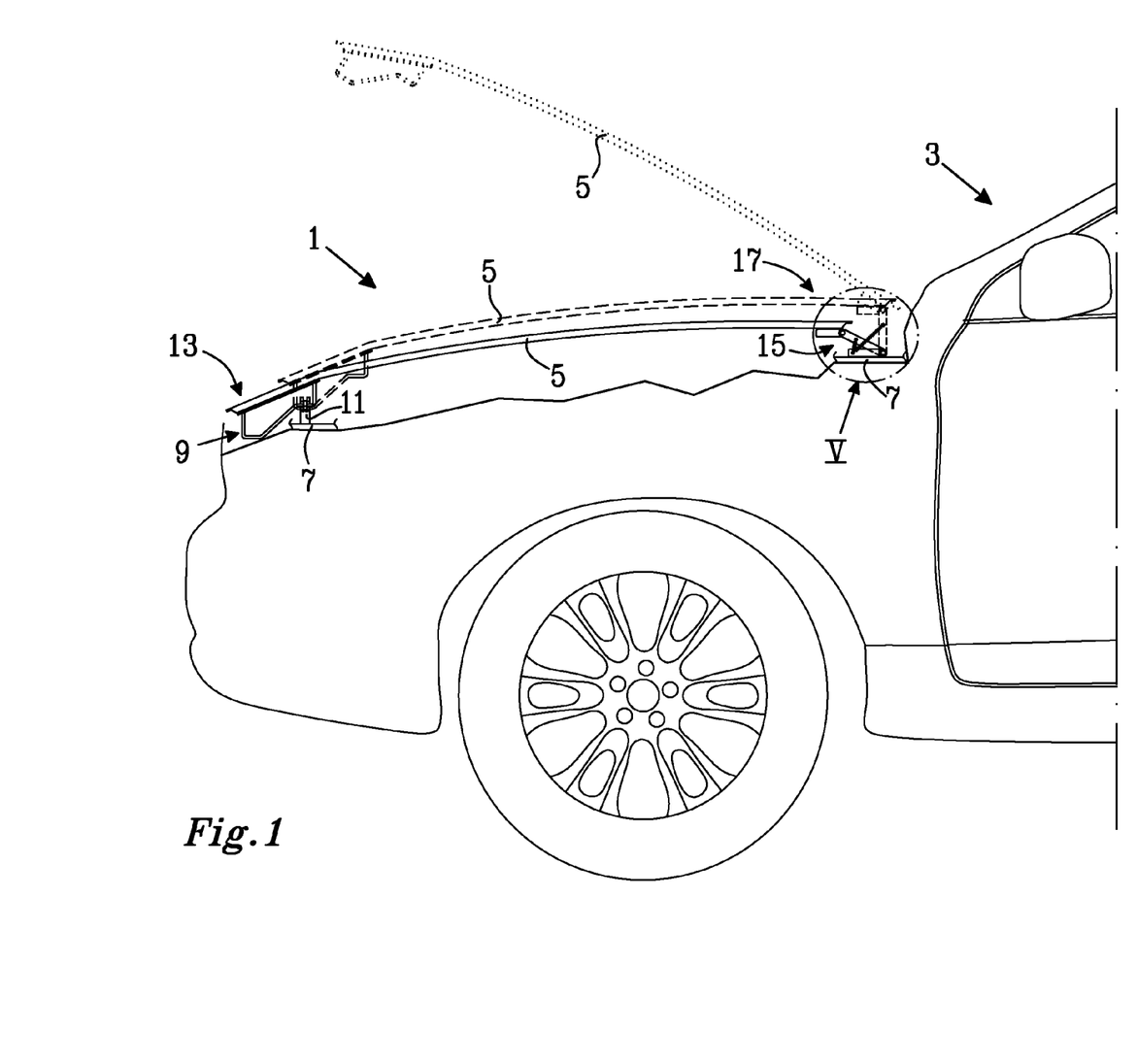
FIG. 1 is a schematic side view of a safety arrangement comprising a bonnet, a catch, a lock member and a hinge according to a first embodiment of the disclosure, showing the bonnet in a closed, open and a deployed position, respectively.

FIG. 1 schematically illustrates a safety arrangement 1 of a vehicle 3 according to a first embodiment of the invention. The vehicle is in this case a car 3. The safety arrangement 1 comprises a bonnet 5, a catch 9 and a lock member 11 and a hinge 15. The bonnet 5 is connected to a body 7 of the vehicle 3 by the catch 9 and the lock member 11 at a front end 13 of the bonnet 5, and by the hinge 15 at a rear end 17 of the bonnet 5. The catch 9 and the lock member 11 will be further described below in conjunction with FIGS. 2-5. The hinge 15 will be further described below in conjunction with FIG. 6.

One pair of catch 9 and lock member 11 may be used. In that case, the pair is preferably located at or adjacent to the center of the front end 13 of the bonnet 5. Alternatively, two, three or more pairs of catch 9 and lock member 11 may be used. Usually, there is one hinge 15 at or adjacent to each lateral side of the rear end 17 of the bonnet 5. However, one, two, three or more hinges may be used.

The bonnet 5 is shown in a closed position, see continuous line, in a deployed position, see dashed line, and in an open position, see pointed line. The open position permits access to the engine compartment, e.g., for service, maintenance or repair work. In order to reach the open position, the bonnet 5 is pivoted at or adjacent to its rear end 17. The bonnet 5 is arranged such that it, at least initially, moves straight upwards in relation to the body 7 of the vehicle 3 when being opened. If the displacement used to reach the open position is a pure rotation, the front end moves along a portion of a circle, the tangent of which will initially be directed straight upwards. However, for some bonnets the displacement towards the open position will instead initially comprise a translational movement in the vertical direction, i.e. upwards. The translation may be utilized to move the catch 9 out of the lock member 11, such that the front end 13 thereafter may rotate freely without interfering with the body 7 of the vehicle 3. The translational displacement may then be followed by a rotational displacement. Further, the displacement from the closed position to the open position may be a combination of translational and rotational displacement.

In the embodiment of FIG. 1, the catch 9 is attached to the bonnet 5, while the lock member 11 is attached to the body 7 of the vehicle 3. As an alternative, the catch 9 may be attached to the body 7 of the vehicle 3 and lock member 11 to the bonnet 5. In any case, the catch 9 and the lock member 11 are located such that they can cooperate with each other, when the bonnet 5 is in the closed position and the deployed position, respectively.

The bonnet 5 is further displaceable from the closed position to the deployed position. As already mentioned above in the background section, it is well-known to use a deployable bonnet in a vehicle. By raising the rear part of the deployable bonnet to a deployed position, the distance between the bonnet and the hard engine parts is increased, thereby reducing the severity of an accident involving a vulnerable road user. However, in addition, the safety arrangement 1 of the invention also raises the front end 13 of the bonnet 5. This is advantageous if the vulnerable road user hits the front portion of the bonnet 5, which e.g. may be the case, if the vulnerable road user is short, e.g., a child.

When being displaced from the closed position to the deployed position, the bonnet 5 moves simultaneously upwards and rearwards. Not only the rear end 17, but also the front end 13, is displaced upwards and rearwards. Preferably, the bonnet 5 is also displaceable from the deployed position back to the closed position, such that the safety arrangement may be restored after the deployed position has been activated.

In the first embodiment illustrated in FIG. 1, the front end 13 of the bonnet 5 is displaced rearwards by at least 40 mm, preferably at least 60 mm, and most preferably at least 100 mm, in relation to the body 7 of the vehicle 3 during the displacement from the closed position to the deployed position.

Further, when the bonnet 5 is in the deployed position, there is a partial access to the engine compartment. Thereby it is possible to fill vehicular liquids, such as a washer fluid or a coolant, without having to open the bonnet 5 to the open position.

In the embodiment illustrated in FIG. 1, it is possible to open the bonnet 5 both from the closed position and the deployed position. Further, it is also possible to open the bonnet 5 at any time, i.e., from any position, during the displacement between the closed and the deployed positions. The bonnet 5 is thus directly openable from the position it is in, which position may be the closed position, the deployed position or any position therebetween. For example, if being opened in the deployed position, there is no need to first move the bonnet 5 back to the closed position in order to open it. In the same way, if the bonnet 5 is in a position passed during the displacement between the closed and the deployed positions, the bonnet 5 may move directly towards the open position, without having to pass any other position being passed during the displacement between the closed and the deployed positions. As described above, the bonnet 5 is pivoted at or adjacent to its rear end 17 in order to permit opening to fully access the engine compartment.

When closing the bonnet 5 again from the open position, the opening displacement is reversed. The bonnet 5 may return to the position it had before being opened. As described above, this position may be the closed position, the deployed position or a position during the displacement between the closed and the deployed position. Alternatively, the bonnet may be returned to another position, when being closed, which is further described below in conjunction with FIG. 5.

Figure 2A:
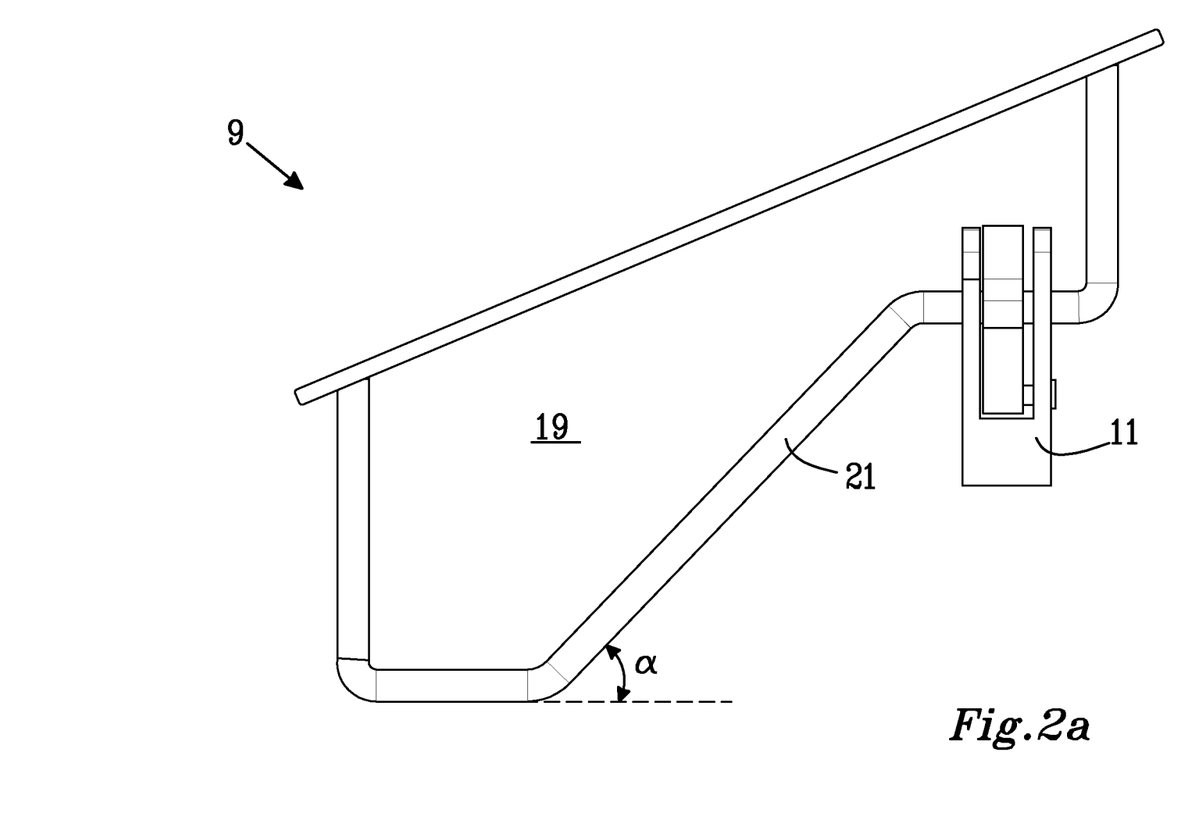
FIG. 2a illustrates the catch and the lock member from a side view, with the bonnet being in the closed position.
Figure 2B:
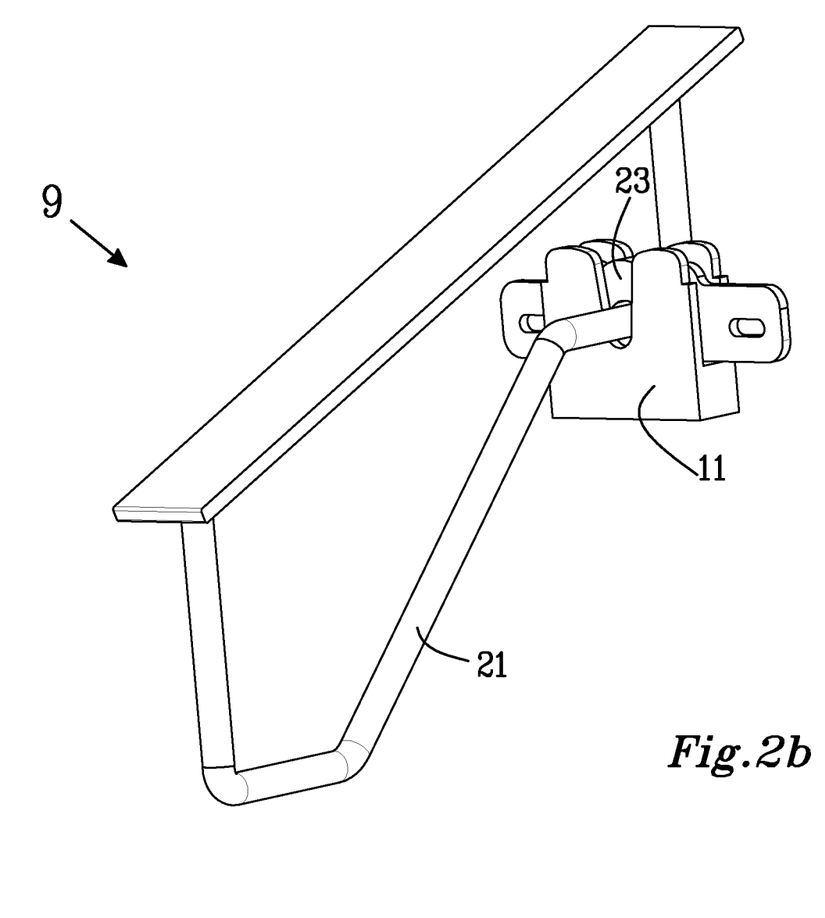
FIG. 2b illustrates the catch and the lock member from a perspective view, with the bonnet being in the closed position.

FIGS. 2a and 2b show a detailed view of FIG. 1 illustrating the catch 9 and the lock member 11 being in a first position relative to each other, corresponding to the bonnet being in its closed position. FIG. 2a shows a side view and 2b a perspective view. The catch 9 comprises an aperture 19 with a closed circumference. Alternatively, part of the circumference may consist of the bonnet 5. When the bonnet 5 is displaced from the closed position to the deployed position, the displacement is guided by means of the lock member 11 following a portion 21 of the closed circumference. In the illustrated example, this portion 21 is inclined having an angle $\alpha$ to the horizontal plane, assuming the vehicle also is on a horizontal plane. The angle $\alpha$ is selected to obtain the desired displacement upwards and rearwards of the bonnet 5. Typically the angle $\alpha$ is between 20 and 80 degrees, preferably between 30 and 70 degrees, and most preferably between 40 and 60 degrees.

In FIGS. 2a and 2b the lock member 11 is shown in a locked state, in which a lock member portion 23 goes through the closed circumference of the catch 9 and retains the catch 9 in the lock member 11.

Figure 3:
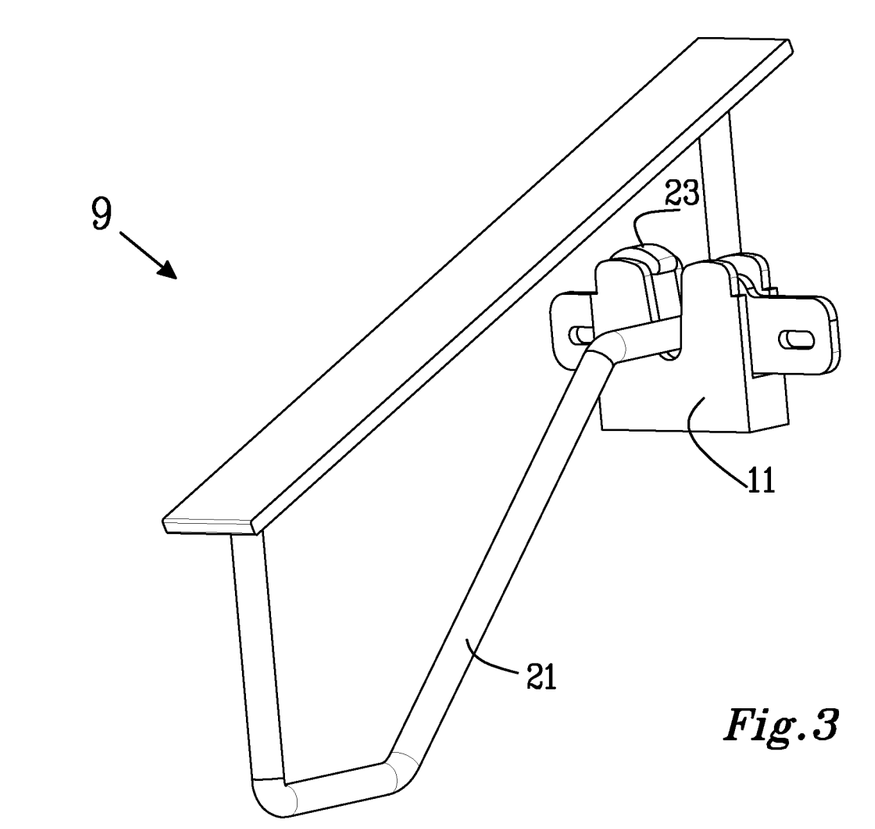
FIG. 3 illustrates the catch and the lock member of FIG. 2b, with the lock member being in an unlocked state.

The lock member portion 23 may be moved to the side, e.g., rotated away, see FIG. 3, thereby setting the lock member 11 in an unlocked state, in which the catch 9 is possible to move upwards, away from the lock member 11. The unlocking of the lock member 11 makes it possible to move the bonnet 5 directly to its open position. Alternatively, two lock member portions may be used, possibly rotating in opposite directions. As another alternative, the lock member portion could be a retractable pin, which goes through the catch 9 when in a locked state, and which pin is refracted to set the lock member 11 in the unlocked state.

When the bonnet 5 is to be closed again, the bonnet 5 is dropped from a position above the lock member 11, such that the catch 9 passes the lock member portion 23. Alternatively, the bonnet 5 may be pushed through the lock member portion 23 by applying a force, e.g., pressing it down by hand force.

Figure 4:
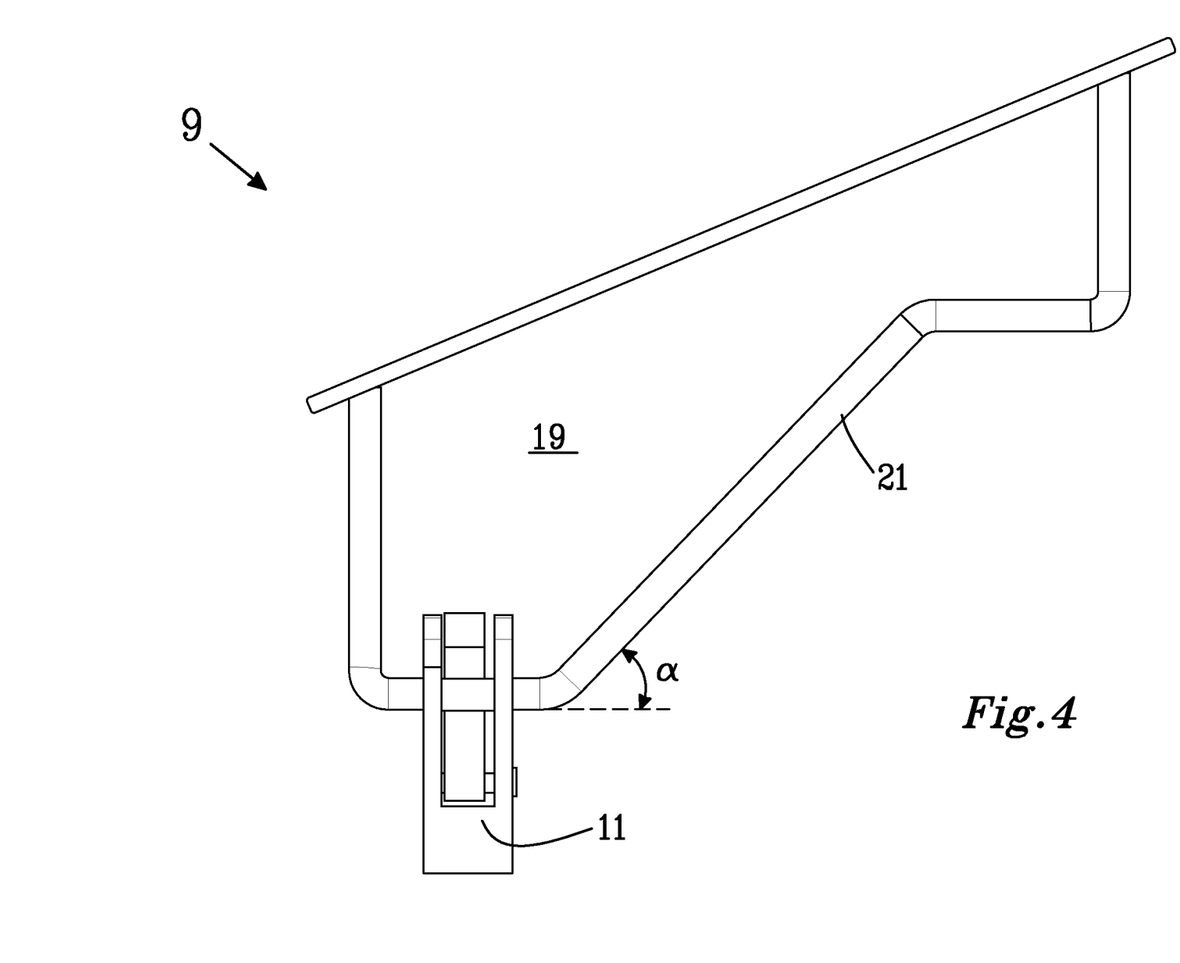
FIG. 4 illustrates the catch and the lock member, with the bonnet being in the deployed position.

FIG. 4 illustrates the catch 9 and the lock member 11 being in a second position relative to each other, corresponding to the bonnet 5 being in its deployed position.

Figure 5:
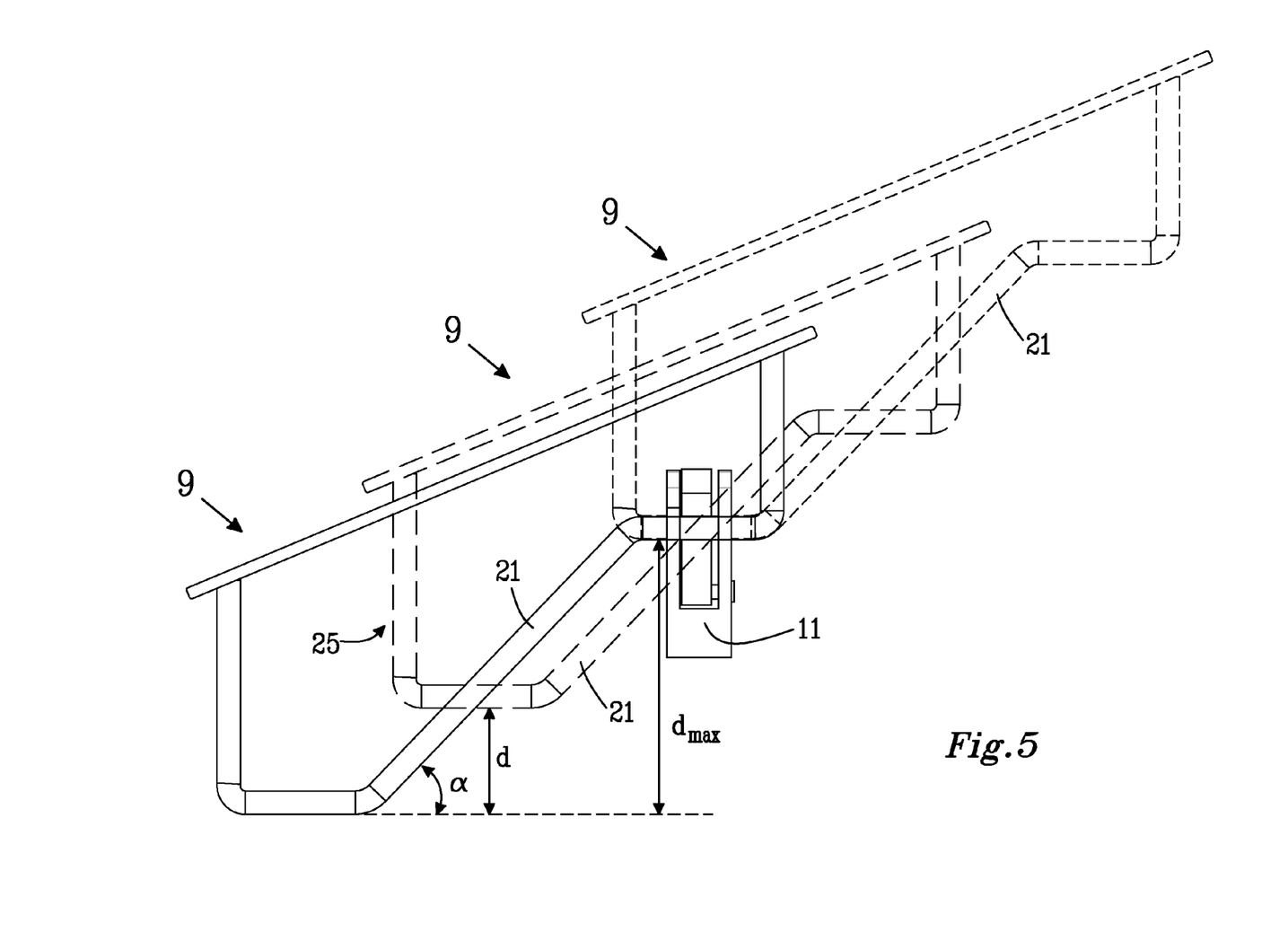
FIG. 5 illustrates a displacement of the bonnet from the closed position to the deployed position.

During the displacement of the bonnet 5 from the closed position, as in FIG. 2a, to the deployed position, as in FIG. 4, the catch 9 is displaced upwards and rearwards in relation to the lock member 11. See FIG. 5 illustrating the displacement. During the displacement, the lock member 11 is in its locked state, in which lock member portion 23 goes through the closed circumference of the catch 9. The lock member 11 thus follows the inclined portion 21 of the closed circumference of the aperture 19.

According to the illustrated embodiment, the bonnet 5 may be opened from the closed position, from the deployed position or from any position therebetween being passed during the displacement between the closed and the deployed positions by removing the lock member portion 23. Therefore, independently of which position the bonnet 5 is in during the displacement from the closed position to the deployed position, the bonnet 5 may be directly opened, in the illustrated embodiment made possible by moving the lock member portion 23 out of the catch 9.

Due to the weight of the bonnet 5, there is often a down-swing when closing the bonnet 5, i.e. the bonnet 5 continues downwards after having passed the closed position. It is thus common practice to provide an extra safety gap of e.g., 5-10 mm between the bonnet 5 and the body 7 of the vehicle 3, in order to avoid that the down-swinging bonnet 5 impacts with the body 7 of the vehicle 3, possibly damaging the bonnet 5 itself or another part of the vehicle 3, such as a headlight, a fender or a bumper.

In the illustrated embodiment, such an extra safety gap could be useful, if closing the bonnet 5 to the closed position, i.e., the catch 9 and the lock member 11 being in the first position relative to each other, see continuous contour of FIG. 5.

However, according to the disclosure, it is instead possible to close the bonnet 5 to a position other than the closed position, to a so-called safe-close position. If the safe-close position is chosen as the deployed position, or a position being passed during the displacement between the closed and the deployed positions not being adjacent to the closed position, there will anyway be a vertical distance d between the bonnet 5 and the body 7 of the vehicle 3, since the deployed position of the bonnet 5 is upwards and rearwards relative to the closed position. The vertical distance d will be able to cope with the possible down-swing of the bonnet 5, when closing the bonnet 5. Therefore, the above extra safety gap can be replaced by the vertical distance d. Thereby, the above extra safety gap may be omitted.

The position of the nearest safe-close position 25, or with other words, the position of the catch 9 and the lock member 11 relative to each other when closing the bonnet 5 to the nearest safe-close position, is chosen dependent of the geometry of the closed circumference of the aperture 19 of the catch 9. In the illustrated embodiment, the nearest position 25 of the safe-close position to the closed position depends on the angle α of the inclined portion 21 of the catch 9. The nearest safe-close position 25 is the position, wherein the vertical distance d is large enough to cope with the down-swing of the bonnet 5, when closing it. The bonnet 5 may then safely be closed to any position between the nearest position 25 and the deployed position, including these positions. The bonnet is thereafter moved from the safe-close position to the closed position. These positions all have an associated vertical distance being larger than the vertical distance d of the nearest position 25 of the safe-close position. The largest vertical distance $d_{max}$ would be obtained, if closing the bonnet 5 to the deployed position.

Figure 6:
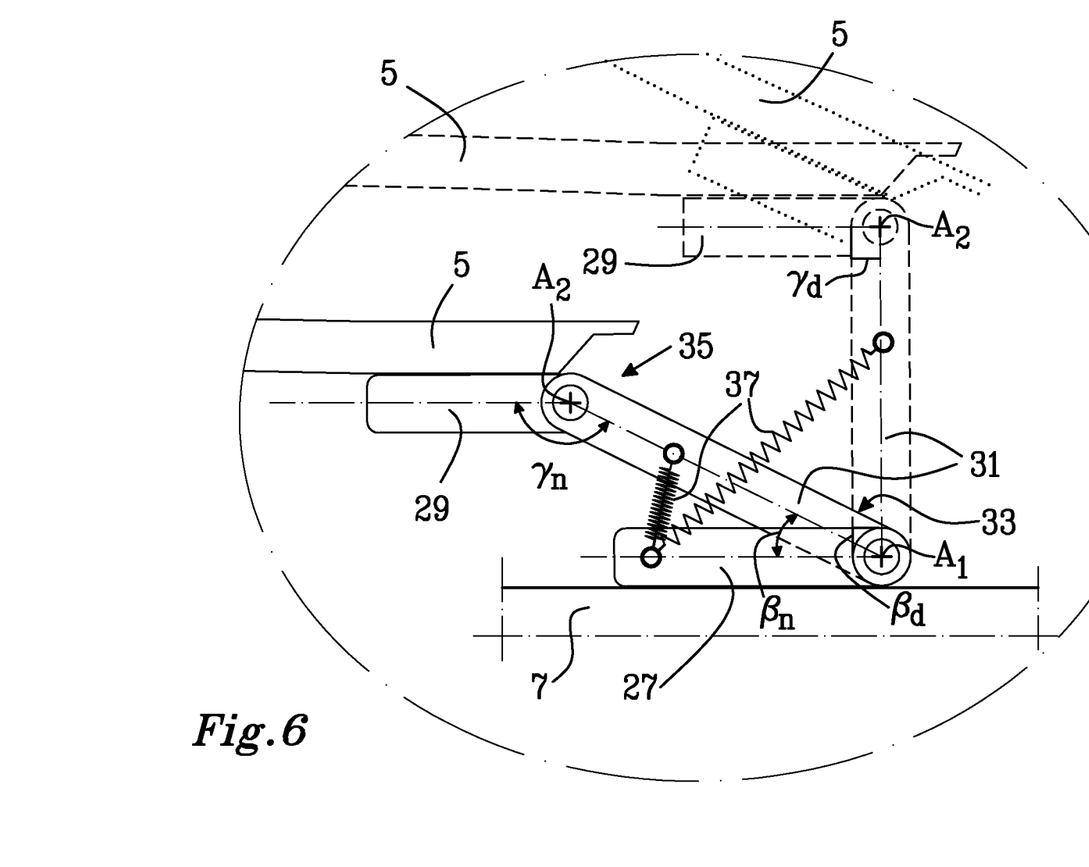
FIG. 6 is a side view of a rear end of the safety arrangement of FIG. 1, with the bonnet being in the closed, open and a deployed position, respectively.

FIG. 6 illustrates the rear end 17 of the bonnet 5 and one of the hinges 15. The hinge 15 is arranged to have a normal position corresponding to the bonnet 5 being in the closed position, see continuous line, and a deployed position, corresponding to the bonnet 5 being in the deployed position, see dashed line. The hinge 15 is displaceable from its normal position to its deployed position, and preferably also from the deployed position back to its normal position. The hinge 15 comprises a first portion 27 attached to the body 7 of the vehicle 3, a second portion 29 attached to the bonnet 5, and a third elongate portion 31 comprising a first end 33 and a second end 35. The third portion 31 is pivotally connected to the first portion 27 by a first pivotal axis A1 at or adjacent to the first end 33, and the third portion 27 is also pivotally connected to the second portion 29 by a second pivotal axis A2 at or adjacent to the second end 35. The first A1 and second A2 pivotal axes extend in the lateral direction of the vehicle 3. The first portion 31 may be a part of the body 7. The second portion 29 may be a part of the bonnet 5. In its simplest form, the hinge 15 hence comprises two pivotal axes A1 and A2 separated by an arm, the third portion 31.

In the normal position of the hinge 15, the third portion 31 forms an acute angle $\beta_n$ in relation to the body 7 of the vehicle 3 and an obtuse angle $\gamma_n$ in relation to the bonnet 5. Thereby the second pivotal axis A2 is located in front of the first pivotal axis A1 in relation to the vehicle 3. The first 27, second 29 and third 31 portions then together form a V-like shape.

In the deployed position, the first 27, second 29 and third 31 portions together form a U-like shape, see dashed line. The third portion 31 then forms a substantially right angle $\beta_d$ in relation to the body 7 of the vehicle 3 and also a substantially right angle $\gamma_d$ in relation to the bonnet 5. Therefore, the second portion 29 will move upwards and rearwards when going from the normal position to the deployed position.

When opening the bonnet 5, the rear end 17 of the bonnet 5 rotates around the second pivotal axis A2. This rotation may be performed both from the normal position of the hinge 15, corresponding to a closed bonnet 5, and from the deployed position of the hinge 15. As already mentioned above, it is also possible to open the bonnet 5 at any time, i.e., from any position, during the displacement between the normal and the deployed positions of the hinge 15.

The hinge 15 further comprises a spring member attached between the first portion 27 and the third portion 31, here illustrated as a helical spring 37. The spring member is arranged such that it is tensioned in the normal position of the hinge 15, e.g., the helical spring 37 being compressed, see continuous line, and released in the deployed position of the hinge 15, see dashed line.

Further, but not illustrated, the hinge 15 may comprise a means, e.g., a pyrotechnic means, adapted to deploy the bonnet 5 in a quick way, in case of an accident with a vulnerable road user being detected. Such a means normally has to be replaced after having been used once in order to make the safety arrangement 1 prepared for another accident involving a vulnerable road user.

Alternatively, or in addition, the above-mentioned spring member may be used to displace the bonnet 5 to the deployed position, in case of an accident with a vulnerable road user being detected.

If the bonnet 5 is displaced to the deployed position in order to permit a partial access to the engine compartment, as described above, the speed of deployment is not a critical issue. The bonnet 5 may in that case be opened by the spring member being released by the user of the vehicle 3, e.g., by means of a handle located within the compartment of the vehicle being mechanically or electronically coupled to a release mechanism for the spring member. When the bonnet 5, and thus also the hinge 15, is displaced back to its normal position, the spring member is tensioned again, i.e., the helical spring 37 is compressed. The handle located within the compartment of the vehicle may be arranged such that it is possible to displace the bonnet 5 from the deployed position back to the closed position by means of the handle. Alternatively, the bonnet 5 may be displaced by the user by hand.

Further modifications of the invention within the scope of the appended claims are feasible. For example, the catch 9 and the lock member 11 may be located at the rear end 17 of the bonnet 5 and the hinge 15 at the front end 13.

As an alternative embodiment, the catch 9 and the lock member 11 according to the disclosure may be combined with a prior art hinge. As another alternative embodiment, the hinge 15 according to the disclosure may be combined with a prior art locking mechanism of the bonnet.

As such, the present disclosure should not be considered as limited by the embodiments and figures described herein. Rather, the full scope of the invention should be determined by the appended claims, with reference to the description and drawings.

What is claimed is:

1. A safety arrangement for a vehicle, the safety arrangement comprising:
   a bonnet being displaceable between a closed position, an open position permitting access to an engine compartment of the vehicle, and a deployed position in which there is a gap between the bonnet and the engine compartment; and
   a hinge adapted to be located at or adjacent to a rear end of the bonnet, the hinge being displaceable between a normal position, corresponding to the bonnet being in the closed position, and a deployed position, corresponding to the bonnet being in the deployed position, the hinge comprising an arm adapted to be connected to a body of the vehicle at a first pivotal axis and adapted to be connected to the bonnet at a second pivotal axis, wherein in the normal position of the hinge, the arm is configured to form an acute angle in relation to the body of the vehicle and an obtuse angle in relation to the bonnet by the second pivotal axis being located forward of the first pivotal axis, and wherein in the deployed position, the arm is substantially vertical;
   wherein the bonnet is displaceable from the closed position to the deployed position, which is located upwards and rearwards as compared to the closed position;
   and wherein the bonnet is directly openable to the open position both from the closed position and from the deployed position.

2. The safety arrangement according to claim 1 wherein the bonnet is arranged to initially move straight upwards when being opened.

3. The safety arrangement according to claim 1 wherein the bonnet in addition is directly openable from a position passable during the displacement from the closed position to the deployed position.

4. The safety arrangement according to claim 1 wherein the bonnet is directly openable from any position passable during the displacement from the closed position to the deployed position.

5. The safety arrangement according to claim 1 wherein the deployed position of the bonnet permits a partial access to the engine compartment for filling a vehicular liquid.

6. The safety arrangement according to claim 1 wherein the safety arrangement is arranged such that a front end of the bonnet is configured to be displaced rearwards by at least 40 mm in relation to a bony of the vehicle during the displacement from the closed position to the deployed position.

7. The safety arrangement according to claim 1 wherein the bonnet also is displaceable from the deployed position to the closed position.

8. The safety arrangement according to claim 1 wherein the bonnet is adapted to be closed to a safe-close position, which is a position passable during the displacement from the closed position to the deployed position, which is however not closer to the closed position than a nearest safe-close position, the nearest safe-close position being selected, such that a vertical distance between the bonnet and a body of the vehicle resulting from the upwards and rearwards displacement of the bonnet is large enough to cope with a possible down swing of the bonnet, when closing the bonnet.

9. The safety arrangement according to claim 1 further comprising a catch and a lock member, one of the catch or the lock member being adapted to be fastened at a front end of the bonnet, and the other of the catch or the lock member being adapted to be fastened to a body of the vehicle at a position permitting cooperation between the catch and the lock member, wherein the catch or lock member adapted to be fastened at the front end of the bonnet is configured to be displaced upwards and rearwards in relation to the other of the catch or lock member during the displacement of the bonnet from the closed position to the deployed position.

10. The safety arrangement according to claim 9 wherein the catch comprises an aperture with is closed circumference, and wherein at least a portion of the lock member is configured to be displaced within the closed circumference during displacement of the bonnet from the closed position to the deployed position.

11. The safety arrangement according to claim 10 wherein the lock member is configured to follow at least a portion of the closed circumference for guiding the displacement of the bonnet from the closed position to the deployed position.

12. The safety arrangement of claim 11 wherein the closed circumference comprises an inclined portion having an angle of between 20 and 80 degrees to a horizontal plane of the vehicle.

13. The safety arrangement according to claim 1 wherein, in the deployed position of the hinge, the arm is configured to form a substantially right angle in relation to the body of the vehicle and/or a substantially right angle in relation to the bonnet.

14. The safety arrangement according to claim 1 wherein the hinge further comprises a spring member configured to be attached between the body of the vehicle and the arm, the spring member being arrangeable such that it is compressed in the normal position of the hinge and released in the deployed position of the hinge.

15. A vehicle comprising:
   a vehicle body; and a safety arrangement including:
- a bonnet being displaceable between a closed position, an open position permitting access to an engine compartment of the vehicle, and a deployed position in which there is a gap between the bonnet and the engine compartment; and
- a hinge adapted to be located at or adjacent to a rear end of the bonnet, the hinge being displaceable between a normal position, corresponding to the bonnet being in the closed position, and a deployed position, corresponding to the bonnet being in the deployed position, the hinge comprising an arm connected to the vehicle body at a first pivotal axis and connected to the bonnet at a second pivotal axis, wherein in the normal position of the hinge, the arm is configured to form an acute angle in relation to the vehicle body and an obtuse angle in relation to the bonnet by the second pivotal axis being located forward of the first pivotal axis, and wherein in the deployed position, the arm is substantially vertical;

wherein the bonnet is displaceable from the closed position to the deployed position, which is located upwards and rearwards as compared to the closed position;

and wherein the bonnet is directly openable to the open position both from the closed position and from the deployed position.

16. The vehicle of claim 15 wherein, in the deployed position of the hinge, the am is configured to form a substantially right angle in relation to the vehicle body and/or a substantially right angle in relation to the bonnet.

17. The vehicle of claim 15 wherein the hinge further comprises a spring member attached between the vehicle body and the arm, the spring member being arranged such that it is compressed in the normal position of the hinge and released in the deployed position of the hinge.

* * * * *

UNITED STATES PATENT AND TRADEMARK OFFICE
CERTIFICATE OF CORRECTION

| | | |
|---|---|---|
| PATENT NO. | : 9,010,478 B2 | Page 1 of 1 |
| APPLICATION NO. | : 14/079116 | |
| DATED | : April 21, 2015 | |
| INVENTOR(S) | : Fritzon | |

It is certified that error appears in the above-identified patent and that said Letters Patent is hereby corrected as shown below:

In the Claims

Column 12, Line 15, Claim 6:

After "in relation to a"
Delete "bony" and
Insert --body--.

Signed and Sealed this
Twenty-ninth Day of December, 2015

Michelle K. Lee
*Director of the United States Patent and Trademark Office*